United States Patent
Park et al.

(10) Patent No.: US 7,598,890 B2
(45) Date of Patent: Oct. 6, 2009

(54) APPARATUS AND METHOD FOR CHARACTER ENTRY IN A PORTABLE TERMINAL

(75) Inventors: Young-Soo Park, Yongin-si (KR); Seung-Gun Park, Yongin-si (KR); Gwan-Seok Ko, Seongnam-si (KR); Jae-Gwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 637 days.

(21) Appl. No.: 11/482,711

(22) Filed: Jul. 10, 2006

(65) Prior Publication Data

US 2007/0229312 A1 Oct. 4, 2007

(30) Foreign Application Priority Data

Mar. 15, 2006 (KR) .............. 10-2006-0023897

(51) Int. Cl.
H03K 17/84 (2006.01)
(52) U.S. Cl. .................. 341/22; 341/34; 345/160; 400/485
(58) Field of Classification Search .......... 341/20, 341/22, 34; 345/157, 160; 400/485
See application file for complete search history.

(56) References Cited

U.S. PATENT DOCUMENTS 4,585,908 A 4/1986 Smith
7,423,556 B2 * 9/2008 Park et al. ............ 341/22
2002/0063687 A1 * 5/2002 Kim ..................... 345/160
2003/0223798 A1 * 12/2003 Zhang et al. ........... 400/485
2004/0198400 A1 * 10/2004 Lin ....................... 455/466

FOREIGN PATENT DOCUMENTS

| JP | 2002342011 | 11/2002 |
|---|---|---|
| KR | 1020020053784 | 7/2002 |
| KR | 1020030089991 | 11/2003 |
| KR | 10-2005-0003828 A | 1/2005 |

* cited by examiner

Primary Examiner—Timothy Edwards, Jr.
(74) Attorney, Agent, or Firm—Roylance, Abrams, Berdo & Goodman, L.L.P.

(57) ABSTRACT

A character entry method and apparatus in a terminal in which characters are grouped into a plurality of character sets and a representative character of each of the character sets is imprinted on a respective key are provided. In the character entry method, when a key imprinted with a representative character is pressed, characters belonging to a character set represented by the representative character are displayed. When a directional key is pressed, the number or duration of key presses of the directional key is counted or measured. A character corresponding to the number or duration of key presses is selected among the displayed characters and entered.

26 Claims, 6 Drawing Sheets

APPARATUS AND METHOD FOR CHARACTER ENTRY IN A PORTABLE TERMINAL

CROSS-REFERENCE TO RELATED PATENT APPLICATION

This application claims the benefit under 35 U.S.C. § 119(a) to an application entitled "Apparatus and Method for Character Entry in a Portable Terminal" filed in the Korean Intellectual Property Office on Mar. 15, 2006 and assigned Serial No. 2006-23897, the entire disclosure of which is hereby incorporated by reference.

BACKGROUND OF THE INVENTION

1. Field of the Invention:

The present invention relates generally to an apparatus and method for entering characters in a portable terminal. More particularly, the present invention relates to a character entry apparatus and method for reducing the number of key presses and the number of wrong entries in a portable terminal.

2. Description of the Related Art:

Typically, a small-size portable terminal has a limited number of keys, for example, 10 to 12 keys to enter characters with. For languages having 10 to 12 characters in their alphabet, one character is allocated to each key. However, for languages that have a greater number of characters in their alphabet, one key-to-one character assignment is impossible.

Figure 1:
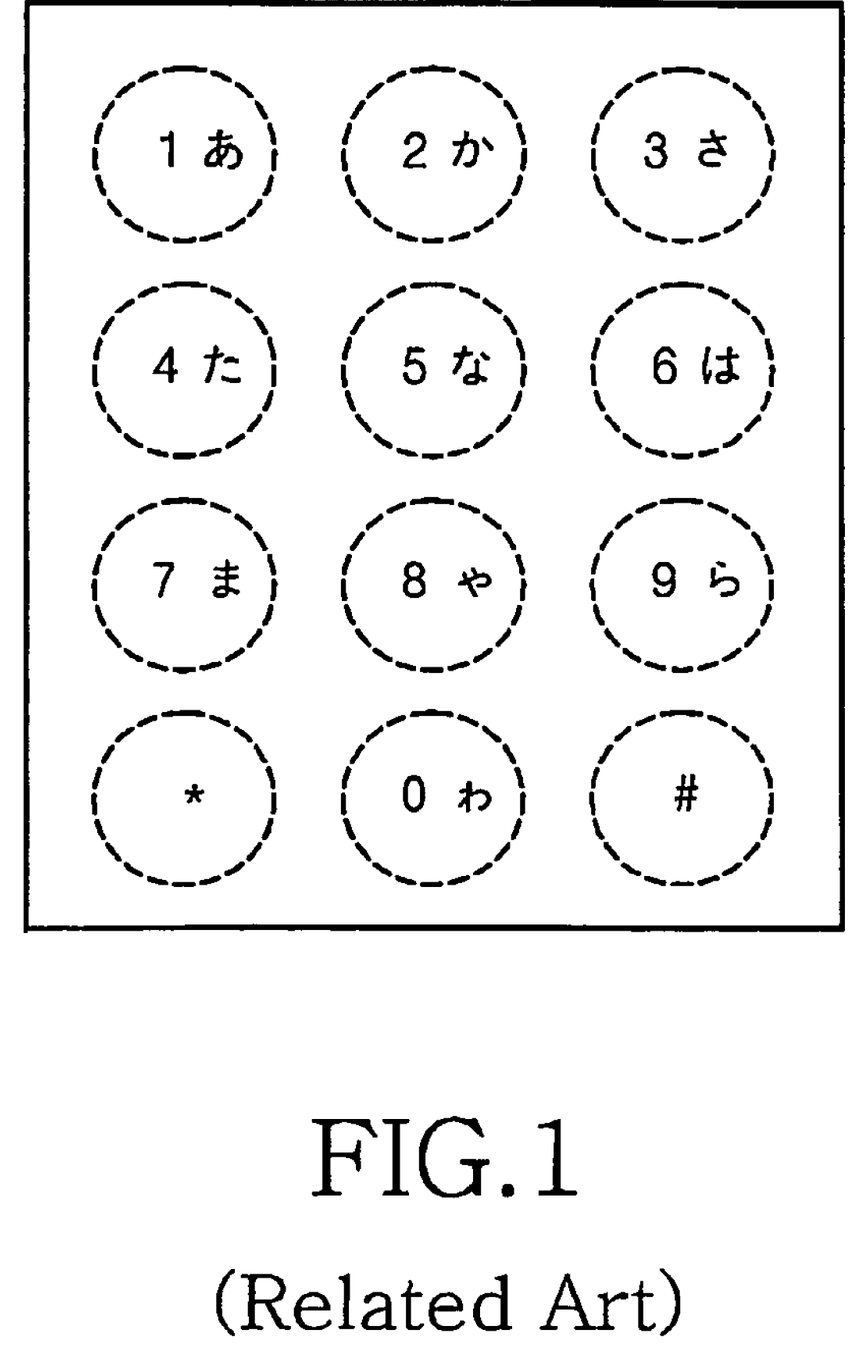
FIG. 1 illustrates a keypad in a portable terminal, configured to enter the Japanese characters according to a Japanese standard.

FIG. 1 illustrates a keypad in a portable terminal, configured to enter the Japanese characters according to a Japanese standard.

Referring to FIG. 1, the Japanese characters of the Japanese alphabet (Hiragana) are arranged in order by groups of five for assignment to each key. For example, a group of "あいうえお" is allocated to a digit "1" key, and a group of "かきくけこ" to a digit "2" key. In this manner, a plurality of characters are allocated to the other digit keys and each digit key is imprinted with the first character of a corresponding group.

On a keypad with the above Japanese alphabet layout, a user enters text in a multi-tap fashion. For example, to enter a word "かえろ",he presses the digit "2" key twice for entering "か",presses the digit "1" key four times for entering "え",and presses the digit "9" key five times for entering "ろ" .The word "かえろ"takes a total of 10 taps.

For most languages, character entry relies on the multi-tap scheme. Because of mapping between a plurality of characters and one key, the multi-tap scheme is not user-friendly and is vulnerable to an incorrect entry. To solve this problem, a single-tap character entry scheme was proposed. For details about the single-tap scheme, see T9 (http//www.T9.com), eZi (http//gcorp.com), itap (http//www.mot.com/lexicus/html/itap.html), and especially for the Japanese language, POS (http//www.muchy.com), the entire contents of each are hereby incorporated by reference. In the single-tap scheme, one tap or key press is sufficient for entry of one character. This entry scheme is based on an algorithm which automatically displays a word matching to a combination of input characters after searching a dictionary of a given language.

By way of example for the English language, to enter "boy" by the single-tap scheme, the user presses the digit "1" key having the letters "ABC" imprinted thereon for entering "b", the digit "6" key for entering "o", and the digit "9" key for entering "y". Upon entry of the first character "b", a given dictionary is searched with "b" used as a search key, and upon entry of the second character "o", "bo" is used as a search key. Finally, upon entry of the last character "y", the dictionary is searched using "boy" as a search key. Since "boy" is registered in the dictionary, the user selects "boy".

3×3×3 character combinations can be created using three keys ABC, MNO and WXY. With the first key press, "ABC" is entered at once, and with the second key press "MNO" is entered at once, thereby displaying the possible combinations of letters in ABC times MNO {AM, AN, AO, BM, BN, BO, CM, CN, CO}. Here, the desired character combination is "bo". The system continuously searches the dictionary for the next character entry despite the possibility of there being correct words among the two-character combinations, and finally identifies the desired word. During the process, the character combinations associated with the key presses, which can be used as the beginning of the desired word, "bo" for example, can be selected and displayed continuously. Then, the dictionary is searched in order to find all of the words, which include "bo" in the beginning of the words, and displays the resulting words. The user can identify and select the desired word among the words that the system speculates and displays.

As described above, the single-tap scheme has recently emerged as a character entry technique for a small-size keypad with a limited number of keys, thereby substituting for the multi-tap scheme. The single-tap scheme pursues the efficiency of character entry through a reduction of the number of key presses and increases the likelihood of accurate character entry.

As previously stated, a plurality of characters are inevitably allocated to a single key in a keypad with a limited number of keys and thus one character is accessed by the multi-tap scheme, despite the shortcomings of a large number of key presses and frequent wrong entry.

On the other hand, while the single-tap scheme is effective in reducing the number of key presses, it requires a dictionary for a given language and updating of the dictionary with newly coined words, new abbreviations, or the like. In practice, it is impossible to include every needed word in a rapidly developing information and communication environment, such as person names, Internet addresses, home addresses, or the like. What is worse, for a word not registered in the dictionary, the single-tap scheme must be used in conjunction with the multi-tap scheme. In this context, the one-key-for-one-letter method has its own limitations and increases system load due to a large number of character combinations resulting from a plurality of character entries and the accompanying directional searches.

Accordingly, there is a need for an improved apparatus and method for character entry to substantially solve problems encountered with the multi-tap and single-tap schemes

SUMMARY OF THE INVENTION

Exemplary embodiments of the present invention address at least the above problems and/or disadvantages and provide at least the advantages described below. Accordingly, an aspect of the present invention is to provide an apparatus and method for character entry to substantially solve problems encountered with the multi-tap and single-tap schemes.

Another aspect of the present invention is to provide an apparatus and method for efficiently entering characters in a portable terminal.

A further aspect of the present invention is to provide an apparatus and method for character entry to reduce the number of key presses and likelihood of an erroneous entry.

The above aspects are achieved by a providing character entry method and apparatus in a terminal in which characters are grouped into a plurality of character sets and a representative character of each of the character sets is imprinted on a respective key.

According to one aspect of the present invention, in a character entry method in a terminal in which characters are grouped into a plurality of character sets and a representative character of each of the character sets is imprinted on a respective key, when a key imprinted with a representative character is pressed, characters belonging to a character set represented by the representative character are displayed. When a directional key is pressed, the number of key presses of the directional key is counted. A character corresponding to the number of key presses is selected among the displayed characters and entered.

According to another aspect of the present invention, in a character entry apparatus in a portable terminal, a keypad has a plurality of keys wherein characters are grouped into a plurality of character sets and a representative character of each of the character sets is imprinted on a respective key of the plurality of keys. When a key imprinted with a representative character is pressed, a display displays characters belonging to a character set represented by the representative character. When a directional key is pressed, a controller counts the number of key presses of the directional key, selects a character corresponding to the number of key presses among the displayed characters, and enters the selected character.

According to a further aspect of the present invention, in a character entry method in a terminal in which characters are grouped into a plurality of character sets and a representative character of each of the character sets is imprinted on a respective key, when a key imprinted with a representative character is pressed, characters belonging to a character set represented by the representative character are displayed. When a directional key is pressed, the duration of the key press of the directional key is measured. A character corresponding to the key press duration is selected among the displayed characters and entered.

According to still another aspect of the present invention, in a character entry apparatus in a portable terminal, a keypad has a plurality of keys wherein characters are grouped into a plurality of character sets and a representative character of each of the character sets is imprinted on a respective key of the plurality of keys. When a key imprinted with a representative character is pressed, a display displays characters belonging to a character set represented by the representative character. When a directional key is pressed, a controller measures the duration of the key press of the directional key, selects a character corresponding to the key press duration among the displayed characters, and enters the selected character.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A description will be made of an efficient character entry method for a terminal equipped with a keypad having a limited number of keys.

In accordance with an embodiment of the present invention, the characters of an alphabet of a given language are grouped according to a criteria. The criteria can be alphabetical order, phonetic value, character shape, or grammatical characteristics. The criteria is set such that the characters can be grouped with optimal visibility and recognizability to the user. The number of the resulting character groups is preferably 5 to 12, considering that the keypad typically has 12 keys, 5 to 12 character sets are easily allocated to the keys.

After the grouping, a representative character is selected from the characters of each group. The representative characters are determined according to the feature of the language, and it is preferred that each character set has no more than three representative characters. Since the representative characters are imprinted on a small key, the visibility and recognizability of the character layout decreases with the number of representative characters on each key. Accordingly, the representative characters are selected, taking into account visibility and recognizability. Subsequently, the representative characters are allocated and imprinted on about 12 keys on the keypad.

While the present invention is applicable to any language as far as it has a plurality of characters in its alphabet, such as Japanese, Russian, Vietnamese, Hebrew, Arabic, Thai, Chinese, and Korean. However, the present invention is described in the context of the Japanese language.

Grouping of the Japanese characters (Hiragana) and selection of representative characters are based on the keypad layout illustrated in FIG. 1, as a virtual Japanese standard. As described earlier, the Japanese alphabets are grouped row by row, for example, the "あ"row, "い"row, and "さ"row. The first character in each row is a representative of the characters in the character set of the row and is imprinted on a corresponding key.

Figure 2:
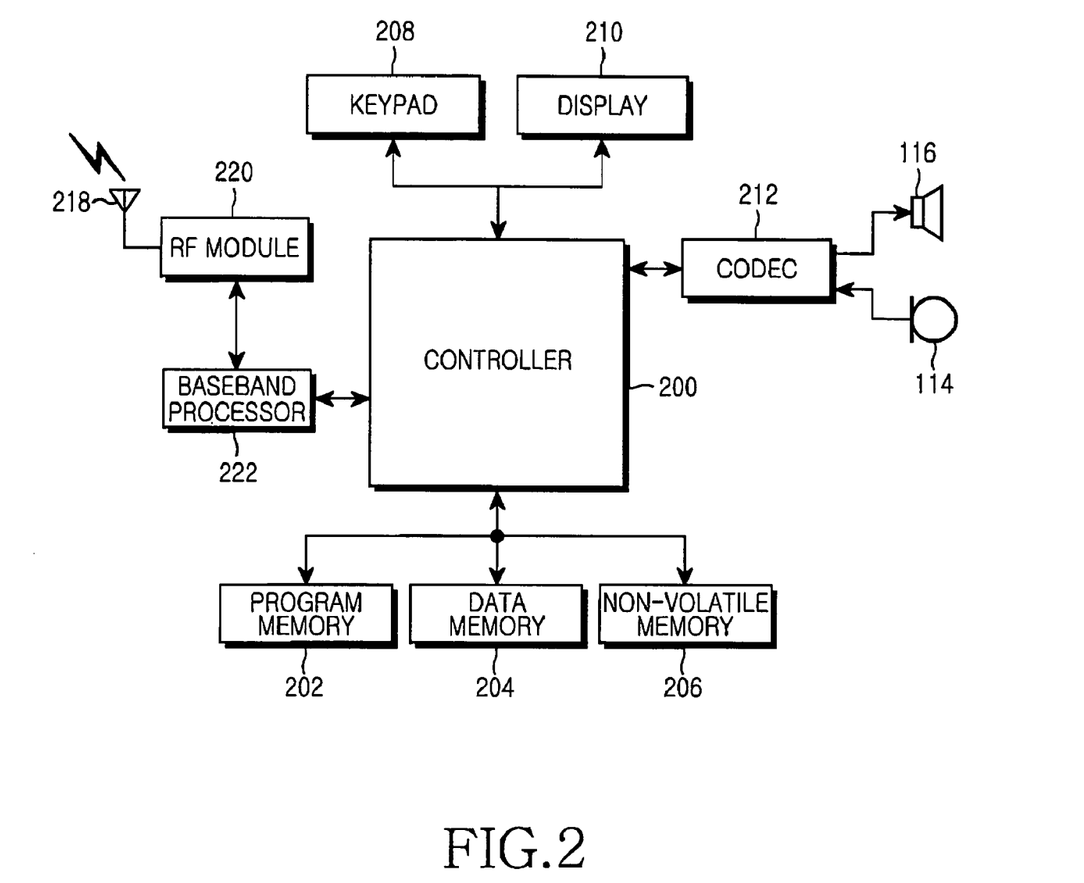
FIG. 2 is a block diagram of a portable terminal according to an embodiment of the present invention.

FIG. 2 is a block diagram of a portable terminal according to an embodiment of the present invention. The term "portable terminal" includes, but is not limited to, a cellular phone, a Personal Communication System (PCS), a Personal Data Assistant (PDA), an International Mobile Telecommunication-2000 (IMT-2000) terminal, and a 4th generation broadband system terminal. The following description is made of a configuration common to the above terminals.

Referring to FIG. 2, a controller 200 provides overall control to the portable terminal. For example, controller 200 processes and controls the portable terminal for voice calls and data communications. In addition to the conventional functionality, the controller 200 performs a character entry algorithm according to the present invention.

A memory t includes a program memory 202, a data memory 240, and a non-volatile memory 206. The memory stores programs for controlling the overall operation of the terminal, temporary data generated during the operation of the terminal, system parameters, and other data to be kept, such as phone numbers, Short Message Service (SMS) messages, or the like.

A keypad 208 is provided with a 4×3 digit key matrix and a plurality of function keys including Talk, OK, and directional keys. The keypad 208 provides key input data corresponding to a key pressed by the user to the controller 200. According to the present invention, the digit keys are imprinted with the representative characters of character sets grouped according to a predetermined criterion. As illustrated in FIG. 1, the digit keys 1 to 0 are sequentially imprinted with "あ", "か", "さ", "た", "な", "は", "ま", "や", "う",and "わ"thereon.

A display 210 displays status information or indicators generated during the operation of the terminal, user-input characters, moving pictures, and still images. The display 210 may be implemented as a touch screen that senses the user's touch.

An audio Coder-Decoder (CODEC) 212 connected to the controller 200, and a speaker 216 and a microphone 214 connected to the CODEC 212 collectively form a voice input/output portion for voice call.

A Radio Frequency (RF) module 220 processes an RF signal received/transmitted from/to an antenna 218. A baseband processor 222 processes baseband signals transmitted/received between the RF module 220 and the controller. 200.

Figure 3:
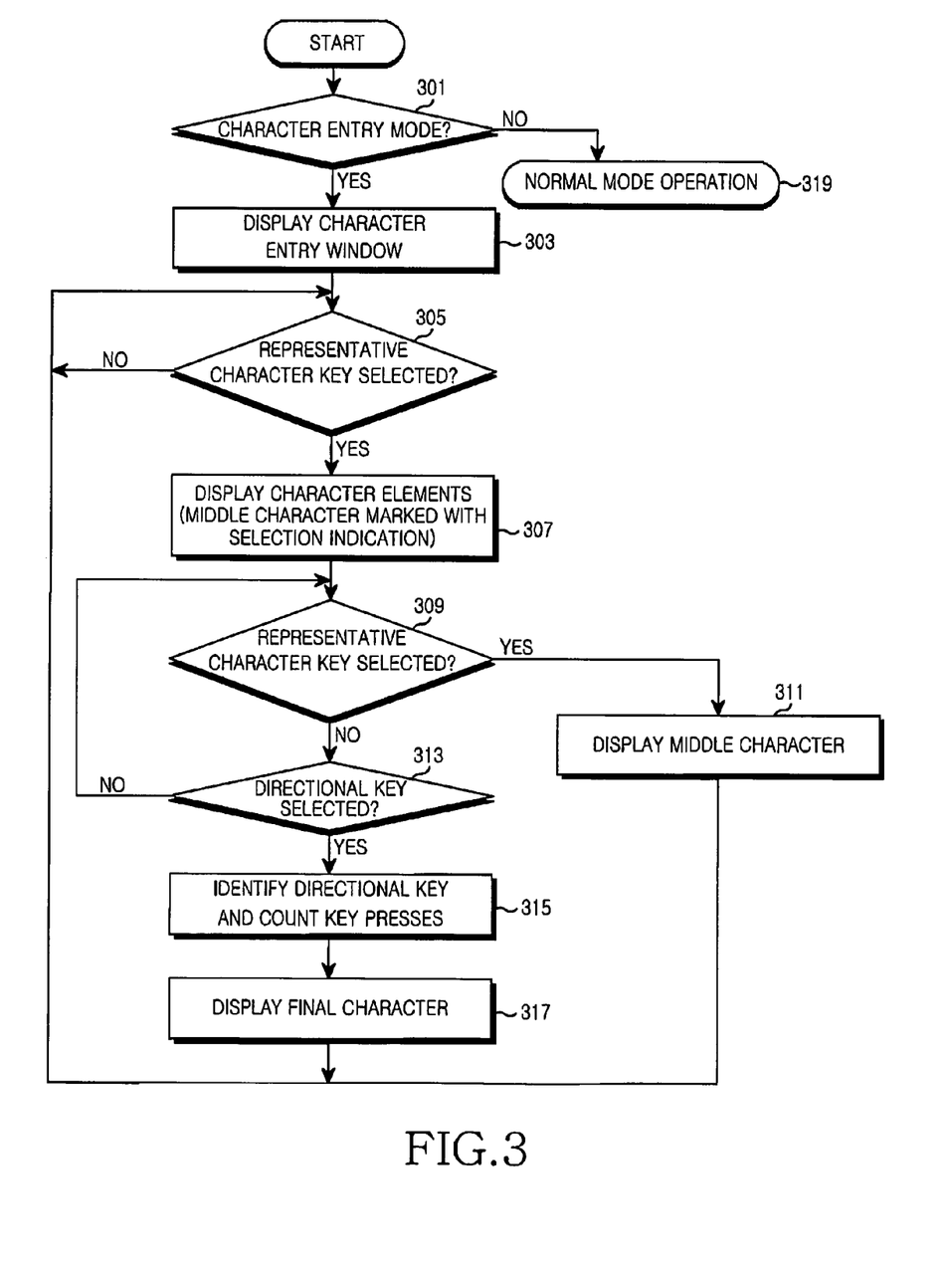
FIG. 3 is a flowchart illustrating an operation for entering Japanese characters in the portable terminal according to an embodiment of the present invention.

FIG. 3 is a flowchart illustrating an operation for entering Japanese characters in the portable terminal according to an embodiment of the present invention.

Referring to FIG. 3, the controller 200 monitors user-selection of a character entry mode in step 301. The character entry mode can be any mode requiring character entry such as a message writing mode, a memo mode, and a schedule mode.

If the character entry mode is not selected, the controller 200 performs a normal mode operationI, such as an idle mode operation, in step 319. Upon selection of the character entry mode, the controller 200 displays a character entry window on the display 210 in step 303.

In step 305, the controller 200 monitors the input of a key with a representative character imprinted thereon, hereinafter referred to as a representative character key. Upon input of the representative character key, the controller 200 displays the characters of a character set that the representative character stands for in step 307. Preferably, the characters of a character set that the representative character stands are displayed at the lower part of the screen.

Figure 5A:
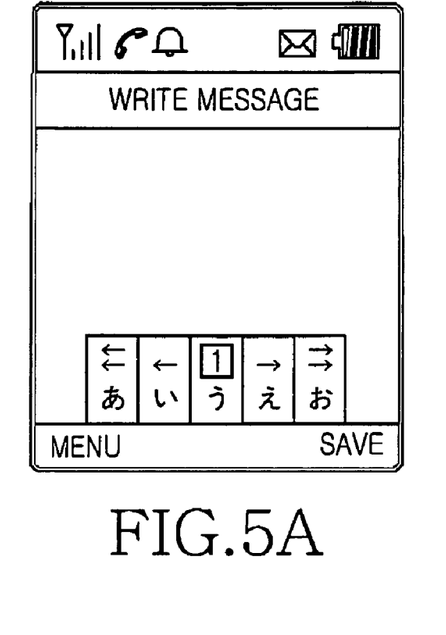
FIGS. 5A to 5D illustrate an example of Japanese character entry according to an embodiment of the present invention.

FIG. 5A illustrates an example of the characters of a character set displayed on the screen. Referring to FIG. 5A, a middle character is imprinted with a selection indication that could be shaded, and the identifier of the representative character, such as a digit, is displayed over the middle character. While it is preferable that the middle character is the representative character, the representative character may be positioned at any other position. Directional arrows are marked so as to be associated with the other characters, but preferably the directional arrows are marked over the other characters. These directional arrows represent directional keys to be selected for entering the associated characters. However, while directional arrows are preferred, other indicators may be used instead of the directional arrows. In the illustrated case of FIG. 5A, for entering "い",a left directional key (←) is pressed once, for entering "お",a right directional key (→) is pressed twice. For entering the middle character, the representative character key or an OK key is pressed. The selection indication may be implemented by shading, underlining, flashing, balloon marking, magnification, or the like.

Figure 5B:
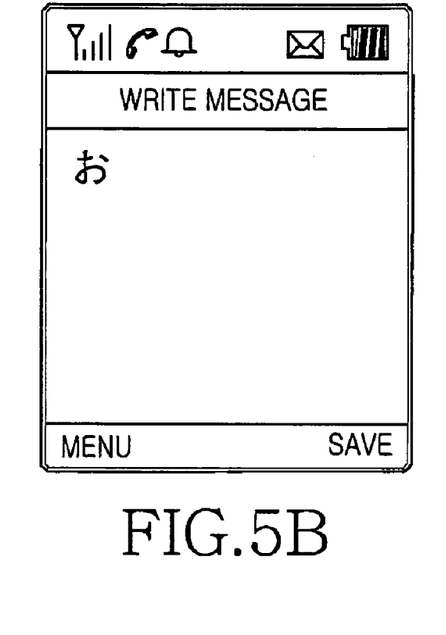
Figure 5C:
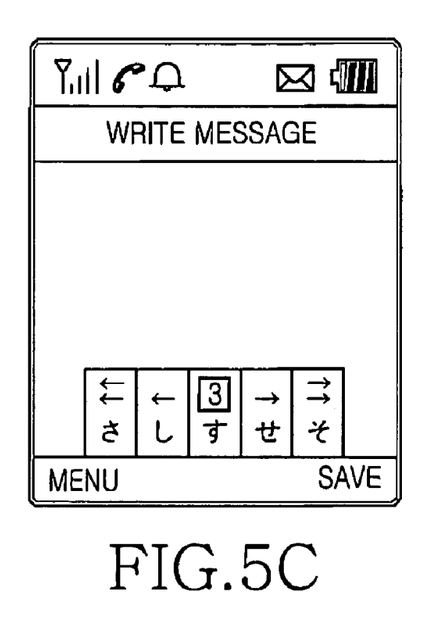
Figure 5D:
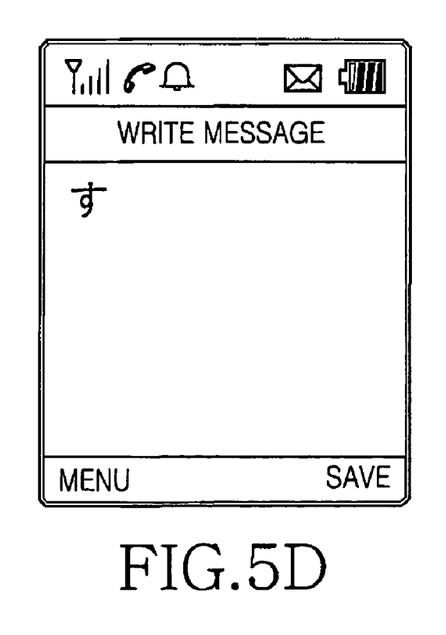

After displaying the character elements represented by the representative character, the controller 200 monitors input of the representative character key or the OK key in step 309. The OK key is a key designated as used to select the middle character marked with the selection indication among the keys of the keypad 208. Upon input of the representative key or the OK key, the controller 200 displays the middle character in step 311. In the illustrated case of FIG. 5C, when the user presses the representative character key, digit 3 in the example, the controller 200 displays "す"on the screen as illustrated in FIG. 5D.

On the other hand, if the representative key has not been pressed, the controller 200 monitors input of a directional key in step 313. If the directional key has not been pressed, the controller 200 returns to step 309. Upon input of the directional key, the controller 200 identifies the directional key and counts the number of key taps in step 315.

In step 317, the controller 200 displays a final character by looking up to a table such as Table 1. Then the controller 200 returns to step 305 to process the next character entry. For example, if the user presses the right directional key (→) twice in the screen display illustrated in FIG. 5A, the controller 200 displays a final character "お"on the screen as illustrated in FIG. 5B.

Table 1 below is a mapping table used for Japanese character entry according to the embodiment of the present invention.

TABLE 1

| Input character | Representative character | Character selection key |
|---|---|---|
| あ | あ | ← ← |
| い |  | ← |
| う |  | representative character key |
| え |  |  |
| お |  | → |
|  |  | → → |
| か | か | ← ← |
| き |  | ← |
| く |  | representative character key |
| け |  |  |
| こ |  | → |
|  |  | → → |
| さ | さ | ← ← |
| し |  | ← |
| す |  | representative character key |
| せ |  |  |
| そ |  | → |
|  |  | → → |
| た | た | ← ← |
| ち |  | ← |

TABLE 1-continued

| Input character | Representative character | Character selection key |
|---|---|---|
| つ | | representative character key |
| て | | → |
| と | | → → |
| な | な | ← ← |
| に | | ← |
| ぬ | | representative character key |
| ね | | → |
| の | | → → |
| は | は | ← ← |
| ひ | | ← |
| ふ | | representative character key |
| へ | | → |
| ほ | | → → |
| ま | ま | ← ← |
| み | | ← |
| む | | representative character key |
| め | | → |
| も | | → → |
| ら | ら | ← ← |
| り | | ← |
| る | | representative character key |
| れ | | → |
| ろ | | → → |
| や | や | ← |
| ゆ | | representative character key |
| よ | | → |
| わ | わ | ← |
| ん | | representative character key |
| を | | → |

As noted from Table 1, the Japanese alphabet is grouped row by row, for example "あ"row, "か"row, and "か"row. The first character in each row is a representative character for the character elements in the row. The characters in each character set or row are entered according to the direction of the direction keys and the count of key taps. For example, to enter a word "よし",the digit "8" key imprinted with the representative character "や"of the character "よ"is pressed and the character elements "や ゆ よ"under "や"are displayed at the lower part of the screen. In this state, the user enters "よ"by pressing the right directional key (→) once. Subsequently, the digit "3" key imprinted with the representative character "さ"of the character "し"is pressed and the character elements "さ し す せ そ"under "さ"are displayed at the lower part of the screen. Then the user presses the left directional key (←) once, thereby entering "し"Thus, entry of the word "よし"takes four key taps in the present invention, compared to the multi-tap scheme in which entry of the word "よし"takes five key taps.

Figure 4:
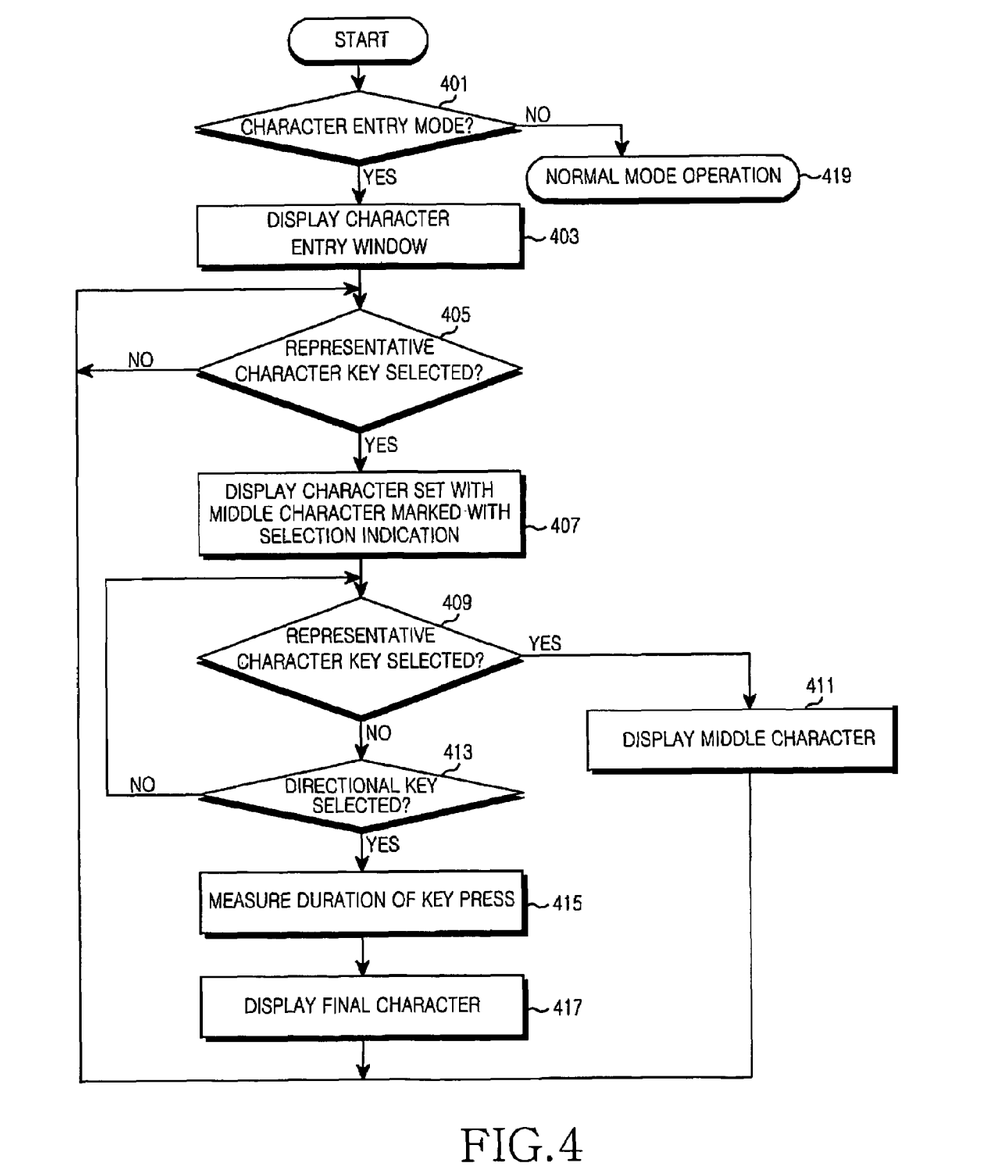
FIG. 4 is a flowchart illustrating an operation for entering Japanese characters in the portable terminal according to an embodiment of the present invention.

FIG. 4 is a flowchart illustrating an operation for entering Japanese characters in the portable terminal according to another embodiment of the present invention.

Referring to FIG. 4, the controller 200 monitors user-selection of a character entry mode in step 401. The character entry mode can be any mode requiring character entry such as a message writing mode, a memo mode, and a schedule mode.

If the character entry mode is not selected, the controller 200 performs a normal mode operation, such as an idle mode operation, in step 419. Upon selection of the character entry mode, the controller 200 displays a character entry window on the display 210 in step 403.

Figure 6A:
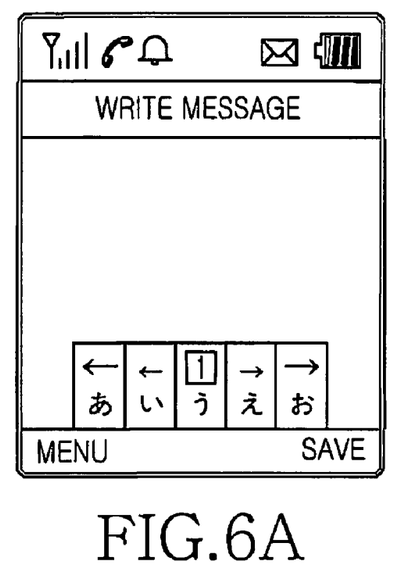
FIGS. 6A to 6D illustrate an example of Japanese character entry according to an embodiment of the present invention.

In step 405, the controller 200 monitors input of a representative character key. Upon input of the representative character key, the controller 200 displays the characters of a character set that the representative character stands for in step 407. Preferably, the characters of a character set that the representative character stands are displayed at the lower part of the screen. A middle character among the characters is marked with a selection indication, and capped with the identifier of the representative character, such as a digit. While it is preferable that the middle character is the representative character, the representative character may be positioned at any other position. Directional arrows are marked so as to be associated with the other characters, but preferably the directional arrows are marked over the other characters While it is preferred that directional arrows be used, other indicators may be used as well. The directional arrows represent directional keys to be selected for entering the associated characters. In the illustrated case of FIG. 6A, for entering "い",the left directional key (←) is pressed once, for entering "お",the right directional key (→) is pressed for a longer period of time, such as for an additional a few seconds. For entering the middle character, the representative character key or the OK key is pressed. The selection indication may be implemented by shading, underlining, flashing, balloon marking, magnification, or the like.

Figure 6B:
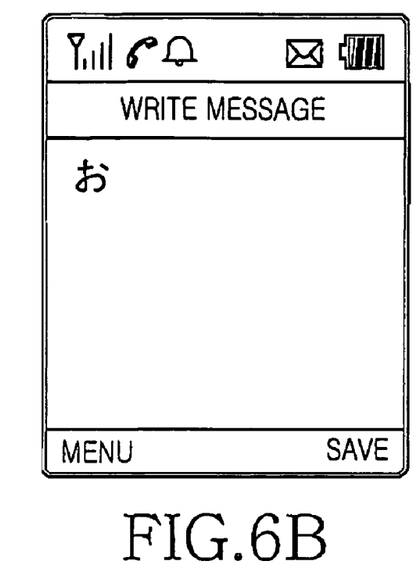
Figure 6C:
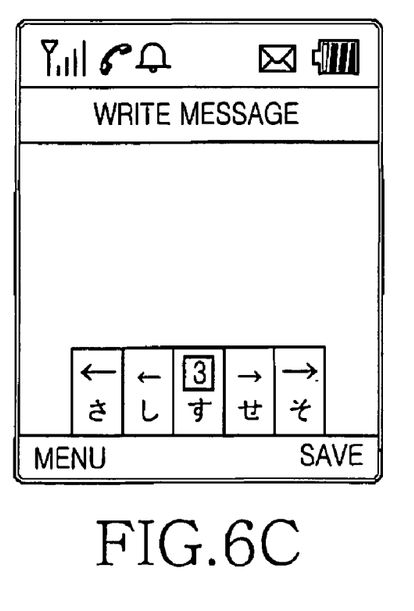
Figure 6D:
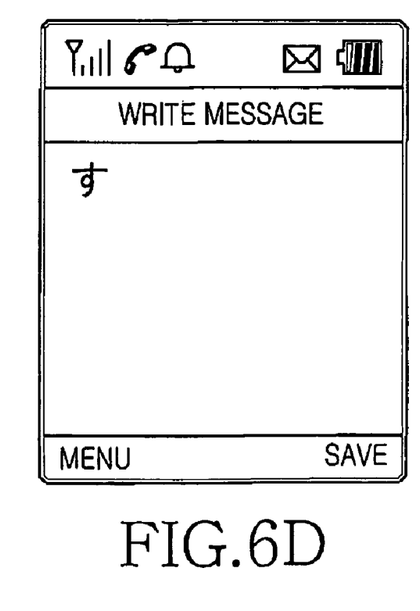

After displaying the character elements represented by the representative character, the controller 200 monitors input of the representative character key or the OK key in step 409. The OK key is a key designated as used to select the middle character marked with the selection indication among the keys of the keypad 208. Upon input of the representative key or the OK key, the controller 200 displays the middle character in step 411. In the illustrated case of FIG. 6C, when the user presses the representative character key, digit 3 in the example, the controller 200 displays "す"on the screen as illustrated in FIG. 6D.

On the other hand, if the representative key has not been pressed, the controller 200 monitors input of a directional key in step 413. If the directional key has not been pressed, the controller 200 returns to step 409. Upon input of the directional key, the controller 200 identifies the directional key and measures the duration of the key press in step 415.

In step 417, the controller 200 displays a final character by looking it up in a table, such as Table 2. Then the controller 200 returns to step 405 to process the next character entry. For example, if the user presses the right directional key (→) long for a few seconds in the screen display illustrated in FIG. 6A, the controller 200 displays a final character "お "on the screen as illustrated in FIG. 6B.

Table 2 below is a mapping table used for Japanese character entry according to the second embodiment of the present invention.

TABLE 2

| Input character | Representative character | Character selection key |
|---|---|---|
| あ | あ | ← long |
| い | | ← |
| う | | representative character key |
| え | | → |
| お | | → long |
| か | か | ← long |
| き | | ← |

TABLE 2-continued

| Input character | Representative character | Character selection key |
|---|---|---|
| く<br>け<br>こ | | representative character key<br>→ |
| さ<br>し<br>す<br>せ<br>そ | さ | → long<br>← long<br>←<br>representative character key<br>→ |
| た<br>ち<br>つ<br>て<br>と | た | → long<br>← long<br>←<br>representative character key<br>→ |
| な<br>に<br>ぬ<br>ね<br>の | な | → long<br>← long<br>←<br>representative character key<br>→ |
| は<br>ひ<br>ふ<br>へ<br>ほ | は | → long<br>← long<br>←<br>representative character key<br>→ |
| ま<br>み<br>む<br>め<br>も | ま | → long<br>← long<br>←<br>representative character key<br>→ |
| ら<br>り<br>る<br>れ<br>ろ | ら | → long<br>← long<br>←<br>representative character key<br>→ |
| や<br>ゆ<br>よ | や | → long<br>←<br>representative character key<br>→ |
| わ<br>ん<br>を | わ | ←<br>representative character key<br>→ |

As noted from Table 2, the Japanese characters are grouped row by row, such as a "あ"row, "か"row, and "か"row. The first character in each row is a representative character for the characters in the row. The characters in each character set or row are entered according to the direction of the direction keys and the duration of a key tap. For example, to enter a word "ほん",the digit "6" key imprinted with the representative character "は"of the character "ほ"is pressed and the character elements "は ひ ふ へ ほ"under "は"are displayed at the lower part of the screen. In this state, the user enters "は"by pressing the right directional key (→) for a few seconds. Subsequently, the digit "0" key imprinted with the representative character "わ"of the character "ん"is pressed and the character elements "わ ん を"under "わ"are displayed at the lower part of the screen. Then the user presses the OK key, thereby entering "を".Thus, entry of the word "ほん"takes four key taps in the present invention, compared to the multi-tap scheme in which entry of the word "ほん"takes seven key taps.

Exemplary embodiments of the present invention can also comprise computer readable codes on a computer readable medium. The computer readable medium can comprise any data storage device that can store data that can be read by a computer system. Examples of a computer readable medium include magnetic storage media (such as, ROM, floppy disks, hard disks, among others), optical recording media (such as, CD-ROMs, or DVDs), and storage mechanisms such as carrier waves (such as, transmission through the Internet). The computer readable medium can also be distributed over network coupled computer systems so that the computer readable code is stored and executed in a distributed fashion. Also, functional programs, codes, and code segments for accomplishing exemplary embodiments of the present invention can be construed by programmers of ordinary skill in the art to which the present invention pertains.

As described above, the present invention advantageously reduces the number of key presses and wrong entries, compared to the conventional multi-tap scheme. Since the present invention obviates the need for a dictionary database and a dictionary search algorithm required for the conventional single-tape scheme, its implementation is simple and system load is decreased. Furthermore, character grouping and designation of representative characters are simple and flexible, which makes the present invention applicable to a variety of languages.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A character entry method in a terminal in which characters are grouped into a plurality of character sets and a representative character of each of the character sets is imprinted on a respective key, comprising the steps of:
   displaying, when a key imprinted with a representative character is pressed, characters belonging to a character set represented by the representative character;
   counting, when a directional key is pressed, the number of key presses of the directional key; and
   selecting a character corresponding to the number of key presses among the displayed characters and entering the selected character.

2. The character entry method of claim 1, wherein a character in the middle of the displayed characters is identified with an identifier of the representative character key, further comprising the step of entering the middle character, when the representative character key is pressed.

3. The character entry method of claim 1, wherein the middle character is marked with a selection indication, further comprising the step of entering the middle character when an OK key is pressed.

4. The character entry method of claim 3, wherein the selection indication is one of shading, underlining, flashing, and magnification.

5. The character entry method of claim 1, wherein the number of key presses required for character entering is indicated adjacent to each of the displayed characters.

6. The character entry method of claim 1, further comprising the step of displaying the entered character on a main screen.

7. The character entry method of claim 1, wherein the character entering step comprises any number of the steps of:
   entering a character that is displayed to the right of the middle character among the displayed characters, when a right directional key is pressed once;

11 entering a character that is displayed to the second right of the middle character among the displayed characters, when the right directional key is pressed successively twice;

entering a character that is displayed to the left of the middle character among the displayed characters, when a left directional key is pressed once; and entering a character that is displayed to the second left of the middle character among the displayed characters, when the left directional key is pressed successively twice.

8. A character entry apparatus in a portable terminal, comprising:

a keypad having a plurality of keys wherein characters are grouped into a plurality of character sets and a representative character of each of the character sets is imprinted on a respective key of the plurality of keys;

a display for, when a key imprinted with a representative character is pressed, displaying characters belonging to a character set represented by the representative character; and a controller for when a directional key is pressed, counting the number of key presses of the directional key, selecting a character corresponding to the number of key presses among the displayed characters, and entering the selected character.

9. The character entry apparatus of claim 8, wherein a character in the middle of the displayed characters is identified with an identifier of the representative character key, and the controller enters the middle character, when the representative character key is pressed.

10. The character entry apparatus of claim 8, wherein the middle character is marked with a selection indication, and the controller enters the middle character when an OK key is pressed.

11. The character entry apparatus of claim 10, wherein the selection indication is one of shading, underlining, flashing, and magnification.

12. The character entry apparatus of claim 8, wherein the number of key presses required for character entering is indicated adjacent to each of the displayed characters.

13. A character entry method in a terminal in which characters are grouped into a plurality of character sets and a representative character of each of the character sets is imprinted on a respective key, comprising the steps of:

displaying, when a key imprinted with a representative character is pressed, characters belonging to a character set represented by the representative character;

measuring, when a directional key is pressed, the duration of the key press of the directional key; and selecting a character corresponding to the key press duration among the displayed characters and entering the selected character.

14. The character entry method of claim 13, wherein a character in the middle of the displayed characters is identified with an identifier of the representative character key, further comprising the step of entering the middle character, when the representative character key is pressed.

15. The character entry method of claim 13, wherein the middle character is marked with a selection indication, further comprising the step of entering the middle character when an OK key is pressed.

16. The character entry method of claim 15, wherein the selection indication is one of shading, underlining, flashing, and magnification.

12

17. The character entry method of claim 13, wherein the duration of key press required for character entering is indicated adjacent to each of the displayed characters.

18. The character entry method of claim 13, further comprising the step of displaying the entered character on a main screen.

19. The character entry method of claim 13, wherein the character entering step comprises any number of the steps of:

entering a character that is displayed to the right of the middle character among the displayed characters, when a right directional key is pressed for a short duration;

entering a character that is displayed to the second right of the middle character among the displayed characters, when the right directional key is pressed for a long duration;

entering a character that is displayed to the left of the middle character among the displayed characters, when a left directional key is pressed for a short duration; and entering a character that is displayed to the second left of the middle character among the displayed characters, when the left directional key is pressed for a long duration.

20. A character entry apparatus in a portable terminal, comprising:

a keypad having a plurality of keys wherein characters are grouped into a plurality of character sets and a representative character of each of the character sets is imprinted on a respective key of the plurality of keys;

a display for, when a key imprinted with a representative character is pressed, displaying characters belonging to a character set represented by the representative character; and a controller for when a directional key is pressed, measuring the duration of the key press of the directional key, selecting a character corresponding to the key press duration among the displayed characters, and entering the selected character.

21. The character entry apparatus of claim 20, wherein a character in the middle of the displayed characters is identified with an identifier of the representative character key, and the controller enters the middle character, when the representative character key is pressed.

22. The character entry apparatus of claim 20, wherein the middle character is marked with a selection indication, and the controller enters the middle character when an OK key is pressed.

23. The character entry apparatus of claim 22, wherein the selection indication is one of shading, underlining, flashing, and magnification.

24. The character entry apparatus of claim 20, wherein the duration of key press required for character entering is indicated adjacent to each of the displayed characters.

25. A computer-readable recording medium having recorded thereon a program for character entry for a terminal, comprising a plurality of keys including directional keys, in which characters are grouped into a plurality of character sets and a representative character of each of the character sets is imprinted on a respective key, comprising:

a first code segment, for causing a computing device to display, when a key imprinted with a representative character is pressed, characters belonging to a character set represented by the representative character;

a second code segment, for causing a computing device to count, when a directional key is pressed, the number of key presses of the directional key;

a third code segment, for causing a computing device to select a character corresponding to the number of key presses among the displayed characters and entering the selected character.

26. A computer-readable recording medium having recorded thereon a program for character entry for a terminal, comprising a plurality of keys including directional keys, in which characters are grouped into a plurality of character sets and a representative character of each of the character sets is imprinted on a respective key, comprising:

a first code segment, for causing a computing device to display, when a key imprinted with a representative character is pressed, characters belonging to a character set represented by the representative character;

a second code segment, for causing a computing device to measure, when a directional key is pressed, the duration of the key press of the directional key;

a third code segment, for causing a computing device to select a character corresponding to the key press duration among the displayed characters and entering the selected character.

* * * * *

UNITED STATES PATENT AND TRADEMARK OFFICE
CERTIFICATE OF CORRECTION

PATENT NO. : 7,598,890 B2  Page 1 of 1
APPLICATION NO. : 11/482711
DATED : October 6, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 725 days.

Signed and Sealed this

Twenty-eighth Day of September, 2010

David J. Kappos
*Director of the United States Patent and Trademark Office*